US012437743B2

(12) United States Patent
Iyer et al.

(10) Patent No.: US 12,437,743 B2
(45) Date of Patent: Oct. 7, 2025

(54) EVENT DETECTIONS FOR NOISE CANCELLING HEADPHONES

(71) Applicant: Hewlett-Packard Development Company, L.P., Spring, TX (US)

(72) Inventors: Amalendu Iyer, Palo Alto, CA (US); Manu Rastogi, Palo Alto, CA (US); Mithra Vankipuram, Palo Alto, CA (US); Srikanth Kuthuru, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 266 days.

(21) Appl. No.: 18/249,169

(22) PCT Filed: Oct. 16, 2020

(86) PCT No.: PCT/US2020/055941

§ 371 (c)(1),
(2) Date: Apr. 14, 2023

(87) PCT Pub. No.: WO2022/081167

PCT Pub. Date: Apr. 21, 2022

(65) Prior Publication Data

US 2023/0410784 A1 Dec. 21, 2023

(51) Int. Cl.
*G10K 11/178* (2006.01)
*H04R 1/10* (2006.01)

(52) U.S. Cl.
CPC .. *G10K 11/17837* (2018.01); *G10K 11/17823* (2018.01); *G10K 11/17873* (2018.01); *H04R 1/1041* (2013.01); *H04R 2460/01* (2013.01)

(58) Field of Classification Search
CPC ....... G10K 11/17885; G10K 11/17837; G10K 11/1783; G10K 11/17827
See application file for complete search history.

(56) References Cited

U.S. PATENT DOCUMENTS 3,961,496 A 6/1976 Ku
9,191,744 B2 11/2015 Anderson
9,788,101 B2 10/2017 Chizi et al.
9,830,930 B2 11/2017 Miller et al.
(Continued)

FOREIGN PATENT DOCUMENTS

JP 2016-532906 A 10/2016
JP 6155622 B2 7/2017
(Continued)

*Primary Examiner* — Kile O Blair
(74) *Attorney, Agent, or Firm* — Quarles & Brady LLP

(57) ABSTRACT

In example implementations, an apparatus is provided. The apparatus includes a plurality of microphones to record background sounds, a noise cancellation component to generate an inverted signal to negate the background sounds from an output signal, a memory to store sound patterns associated with known events, a speaker to output the output signal, and a processor. The processor is to compare a background sound of the background sounds to sound patterns stored in the memory, detect an event when the background sound matches a sound pattern and is coming from behind a user, and execute a corrective action to the output signal in response to the event being detected and the background sound coming from behind the user.

13 Claims, 6 Drawing Sheets

(56) References Cited

U.S. PATENT DOCUMENTS

| | | | | |
|---|---|---|---|---|
| 2010/0302033 | A1 | 12/2010 | Devenyi et al. | |
| 2011/0293103 | A1* | 12/2011 | Park | G10K 11/17854 381/57 |
| 2013/0185066 | A1 | 7/2013 | Tzirkel-Hancock et al. | |
| 2015/0222977 | A1 | 8/2015 | Angel, Jr. | |
| 2016/0093207 | A1 | 3/2016 | Di Censo et al. | |
| 2016/0241947 | A1* | 8/2016 | Degraye | H04R 1/1083 |
| 2017/0221500 | A1* | 8/2017 | Glasgow | H04R 29/005 |
| 2018/0090121 | A1 | 3/2018 | Hamalainen | |
| 2018/0189568 | A1 | 7/2018 | Powderly et al. | |
| 2020/0135163 | A1 | 4/2020 | Lovitt et al. | |
| 2021/0409860 | A1* | 12/2021 | Bean | H04R 1/1091 |

FOREIGN PATENT DOCUMENTS

| | | | |
|---|---|---|---|
| WO | 2015/034735 | A1 | 3/2015 |
| WO | 2019/149996 | A1 | 8/2019 |

* cited by examiner

200

EVENT DETECTIONS FOR NOISE CANCELLING HEADPHONES

BACKGROUND

Headphones can be used to listen to various audio without disturbing others that may be nearby. In some instances, headphones may be worn outside while a user is commuting to work or simply outside exercising. The headphones may be used to listen to music, audio from a video, audio recordings, and the like.

DETAILED DESCRIPTION

Examples described herein provide an apparatus and method to detect events in noise cancelling headphones. Headphones can be used to listen to various audio without disturbing others. Some headphones may include technology that may make it difficult to hear ambient noise or environmental sounds around them. Thus, when a user is walking around outside with headphones on, the user may be unable to hear oncoming cars, sirens, horns, and the like, that may pose a threat to the user.

The present disclosure provides an apparatus and method that can detect events based on analysis of background noise and/or ambient sounds around the user. The headphones may be able to take corrective action if an event is detected. For example, the event may be detection of an oncoming train and the headphones may deactivate a noise cancellation feature, pass the sound of the oncoming train through the headphones, and the like.

In some examples, the headphones may determine a gaze of a user to determine if a corrective action should be executed. For example, the headphones may include sensors that can detect a direction of gaze of the user. The direction of gaze may be compared to an incoming direction of the sounds associated with the detected event. If the direction of gaze and the incoming direction of the sounds do not match within a threshold, the corrective action may be executed.

Figure 1:
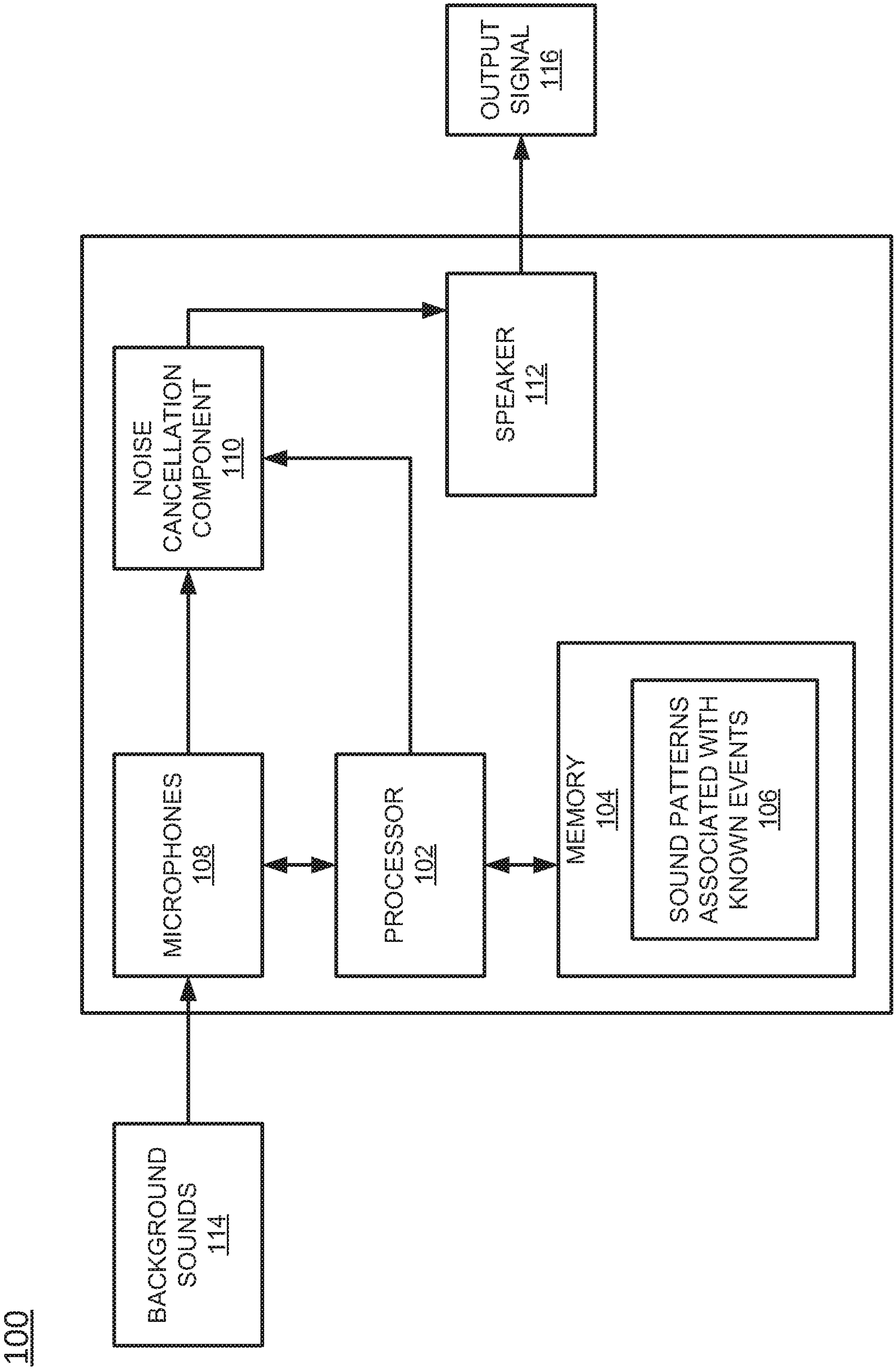
FIG. 1 is a block diagram of an example noise cancelling headphones with event detections of the present disclosure.

FIG. 1 illustrates an example of an apparatus or noise cancelling headphones 100 that can perform event detection of the present disclosure. It should be noted that the noise cancelling headphones 100 have been simplified for explanation. For example, the noise cancelling headphones 100 may include additional components and connected devices that are not shown. For example, the noise cancelling headphones 100 may include a wireless (e.g., Bluetooth) or wired (e.g., an auxiliary connection, a universal serial bus (USB) connection, and the like) communication interface to connect to an electronic device. The electronic device may be portable device or smartphone. The electronic device may provide an audio file that the user would like to listen to via the noise cancelling headphones. The audio file may be a music file, an audio track associated with a movie or video being played on the electronic device, dialogue from a podcast or an ongoing telephone conversation, and the like.

Although a single headphone 100 is illustrated in FIG. 1, it should be noted that the noise cancelling headphones 100 may be deployed in separate earbuds or a single connected headset that can be worn.

In an example, the noise cancelling headphones 100 may include a processor 102, a memory 104, microphones 108, a noise cancellation component 110, and a speaker 112. The processor 102 may be communicatively coupled to the memory 104, the microphones 108, the noise cancellation component 110, and the speaker 112. The processor 102 may control operation of the microphones 108, the noise cancellation component 110, and the speaker 112.

In an example, the memory 104 may be a non-transitory computer readable storage medium. For example, the memory 104 may be a random access memory (RAM), a read only memory (ROM), a hard disk drive, a solid state drive, and the like. The memory 104 may store instructions that are executed by the processor 102 to perform the functions described herein.

In an example, the memory 104 may store sound patterns associated with known events 106 (also referred to herein simply as sound patterns 106). The sound patterns 106 may be pre-defined sounds that are associated with events that are to be detected. The events may include events that are potentially dangerous to a user who may not hear them while wearing and using the noise cancelling headphones 100. For example, the sounds and associated events may include an engine noise of a vehicle (e.g., a car, a motorcycle, a train, a bus, an electric scooter, and the like). The sounds and associated events may include sounds associated with sirens of emergency vehicles (e.g., police sirens, ambulance sirens, and the like). The sounds and associated events may include dangerous activities (e.g., jackhammer, clanging metal at a construction site, drilling sounds, moving cranes and construction equipment, and the like).

In an example, the sound patterns 106 may be compared to background sounds 114 that are recorded or received via the microphones 108. In an example, at least two microphones 108 may be deployed and spaced apart within the noise cancelling headphones 100. For example, one microphone 108 may be located in each headphone where the noise cancelling headphones 100 are deployed as a pair of earbuds. In an example, three microphones 108 may be deployed to help improve localization of an incoming direction of the background sounds 114, as discussed in further details below.

In an example, the processor 102 may use a neural network or signal processing program to perform audio event detection. For example, the background sounds 114 may be analyzed within a time-window (e.g., a 10 second window, a 30 second window, a one minute window, and the like). The time-window may be a continuously rolling window (e.g., analyze background sounds at time=1-10, at time=2-11, at time=3-12, and so forth) or in discrete periods (e.g., analyze background sounds at time=1-10, at time=11-20, at time=21-30, and so forth).

The background sounds 114 may be filtered to identify individual background sounds. For example, the background sounds 114 may be filtered to identify 15 unique background sounds that are combined to form the background sounds 114. In an example, audio classification may be performed via machine learning methods on the background sounds 114 to filter out or identify each background sound. In another example, audio filters that detect certain sound patterns (e.g., machinery, auto engines, sirens, and the like) may be used to identify certain sound patterns that could be an event from the background sounds 114.

The background sounds 114 (either combined or filtered out using one background sound at a time) may be compared to each one of the sound patterns 106 stored in the memory 104. A confidence probability of a match may be calculated for each comparison to each sound pattern 106. If any of the confidence probabilities exceed a confidence threshold (e.g., greater than 90%, 95%, 99%, and the like), a match may be found. The event associated with the sound pattern 106 that matches the background sounds 114, or a background sound filtered from the background sounds 114, may be detected. In an example, it may be possible that multiple events are detected within the background sounds 114. For example, a user may be walking down a street with approaching cars while a police siren is going off in the distance coming towards the user.

In an example, if an event is detected in the analysis of the background sounds 114, then the background sounds 114 may be localized. For example, the incoming direction of the background sounds 114 may be calculated to determine if the incoming direction is in front of the noise cancelling headphones 100. The incoming direction may be calculated on a horizontal plane (e.g., an x-y coordinate plane on a horizontal plane parallel to the ground) or a three-dimensional plane (e.g., x-y-z coordinate plane). For example, the incoming direction may be on a two-dimensional plane (e.g., left right, front, back, or any direction in between on the two-dimensional plane).

With respect to the three-dimensional plane, the incoming direction may also account for a direction along the z-axis (e.g., above or below the user). For example, the incoming direction may be coming from above and behind the user.

In an example, the incoming direction may be calculated using a time-difference of arrival (TDOA) calculation. The TDOA calculation may triangulate a position of the source of the background sounds 114 to then determine the direction from which the background sounds 114 are arriving to the microphones 108. In an example, at least two microphones 108 may be deployed to perform the TDOA calculation. In an example, three microphones 108 may be deployed to perform the TDOA calculation.

In an example, the gaze direction of the user may be determined based on a positioning of the noise cancelling headphones 100. For example, if the left headphone and the right headphone are worn by the user, the noise cancelling headphones 100 may know which direction is forward. In an example, if the incoming direction is at any direction other than from the front of the noise cancelling headphones 100, a corrective action may be executed on the output signal 116.

In an example, a difference threshold may be used. The difference threshold may be an angular value (e.g., 15 degrees, 45 degrees, 90 degrees, and the like). If the angle formed along the horizontal plane between the gaze direction and the incoming direction of the background sounds 114 is greater than the difference threshold, a corrective action may be executed on the output signal 116. Examples of the corrective actions are discussed in further details below.

In an example, the noise cancellation component 110 may generate an inverted signal to cancel background sounds 114 from the audio file that is provided by a connected electronic device. This may help the audio file sound clearer to the user via the noise cancelling headphones 100.

For example, the processor 102 or a separate audio signal processor (not shown) may analyze the incoming background sounds 114 captured by the microphone 108. The processor 102 may determine an inverted signal that would cancel the background sounds 114 from the desired audio (e.g., music, dialogue from a movie, a podcast, a telephone conversation, and the like). The noise cancellation component 110 may generate the inverted signal to cancel the background sounds 114.

In an example, the speaker 112 may output the output signal 116. In an example, the output signal 116 may be a sound file that a user is listening to in which the background sounds 114 are subtracted by the noise cancellation component 110. For example, the sound file may be an audio source the user is trying to listen to. The sound file may be provided to the processor 102 and the speaker 112 via a connected electronic device (not shown).

As described above, the noise cancelling headphones 100 may detect an event when the background sounds 114, or one of the background sounds 114, matches a sound pattern of the sound patterns 106 stored in the memory 104. Previously, the user may not hear the event and be put in a dangerous situation. For example, the user may be walking outside and not hear an oncoming car that is outside of a gaze direction of the user.

In an example, the noise cancelling headphones 100 of the present disclosure may execute a corrective action to the output signal 116 when the event is detected. In an example, the corrective action can also be executed if the event is detected and the incoming direction of the background sounds 114 is not the same as the gaze direction of the user. The corrective action may allow the output signal 116 to include the background sounds 114 that are matched to a sound pattern of an event that is to be detected. As a result, the user may see the event (e.g., an oncoming vehicle, an emergency vehicle with sirens, potential construction work that can be avoided, and the like) and avoid injury or an accident.

In an example, the corrective action may be to disable the noise cancelling component 110. As a result, the inverted signal may be removed from the output signal 116 so that the background sounds 114 can be heard.

In an example, the corrective action may be to add the background sounds 114 back into the output signal 116. For example, the processor 102 may be wired to allow the background sounds 114 to by-pass the noise cancellation component 110 to the speaker 112 to allow the background sounds 114 to be included in the output signal 116. Thus, even though noise cancelling component 110 is activated, the background sounds 114 may still be heard by the user.

In an example, the corrective action may be to add a notification to the output signal 116. For example, an audible message may be added to the output signal 116 that can be heard by the user. The audible message may be associated with the detected event. For example, if the detected event is an oncoming car, the audible message may state "warning, oncoming car". In an example, the audible message may include an incoming direction of the background sounds 114 that was calculated. For example, the audible message may state "warning, oncoming car from your left."

In an example, if the noise cancelling headphones 100 are paired with an electronic device, the notification may be transmitted to the electronic device. For example, a pop-up notification may be shown on the electronic device if the audio output signal is sound from a movie the user is watching on the electronic device, or the notification may cause the electronic device to vibrate in case the device is in the user's pocket, and so forth.

Figure 2:
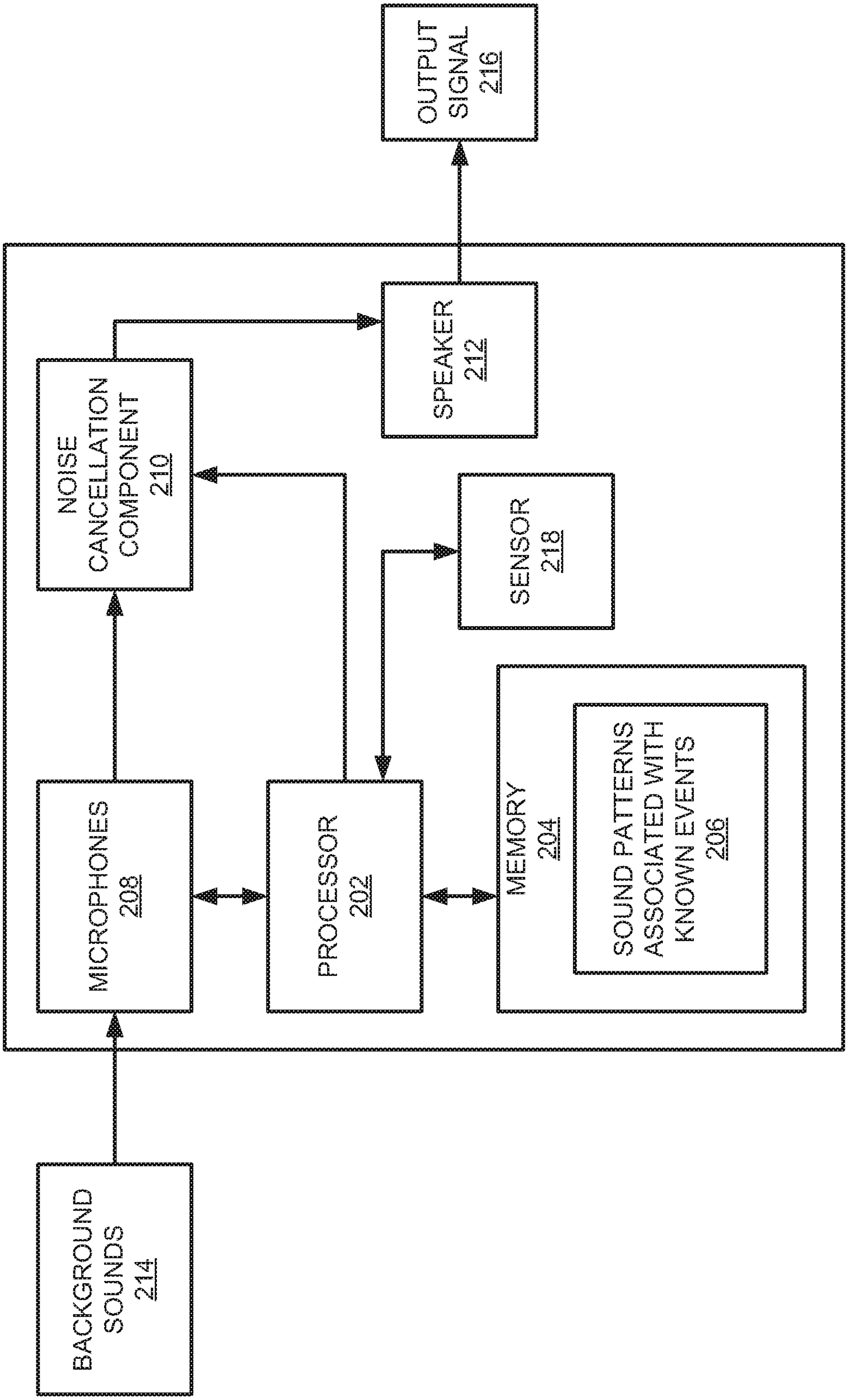
FIG. 2 is a block diagram of another example of noise cancelling headphones with event detections and gaze detection of the present disclosure.

FIG. 2 illustrates another example of an apparatus or noise cancelling headphones 200 that can perform event detection of the present disclosure. The noise cancelling headphones 200 may include a processor 202, a memory 204, microphones 208, a noise cancellation component 210, and a speaker 212. The memory 204 may store sound patterns associated with known events 206 (also referred to herein as sound patterns 206).

The processor 202, the memory 204, the microphones 208, the noise cancellation component 210, and the speaker 212 may be similar to, and perform similar functions to, the processor 102, the memory 102, the microphones 108, the noise cancellation component 110, and the speaker 112, illustrated in FIG. 1, and described above. For example, background sounds 214 may be monitored to detect events based on matches to a sound pattern of the sound patterns 206.

However, the noise cancelling headphones 200 may include a sensor 218. The sensor 218 may help to perform a more accurate calculation of a gaze direction of the user. The sensor 218 may be a gyroscope or an inertial-measurement unit. The sensor 218 may provide a gaze direction along a two-dimensional horizontal plane or along a three-dimensional coordinate system. The gaze direction may be compared to the incoming direction of the background sounds 214, calculated via TDOA, as described above. If the difference is greater than a difference threshold, then the corrective action may be executed on an output signal 216 for detected events, as described above.

Figure 3:
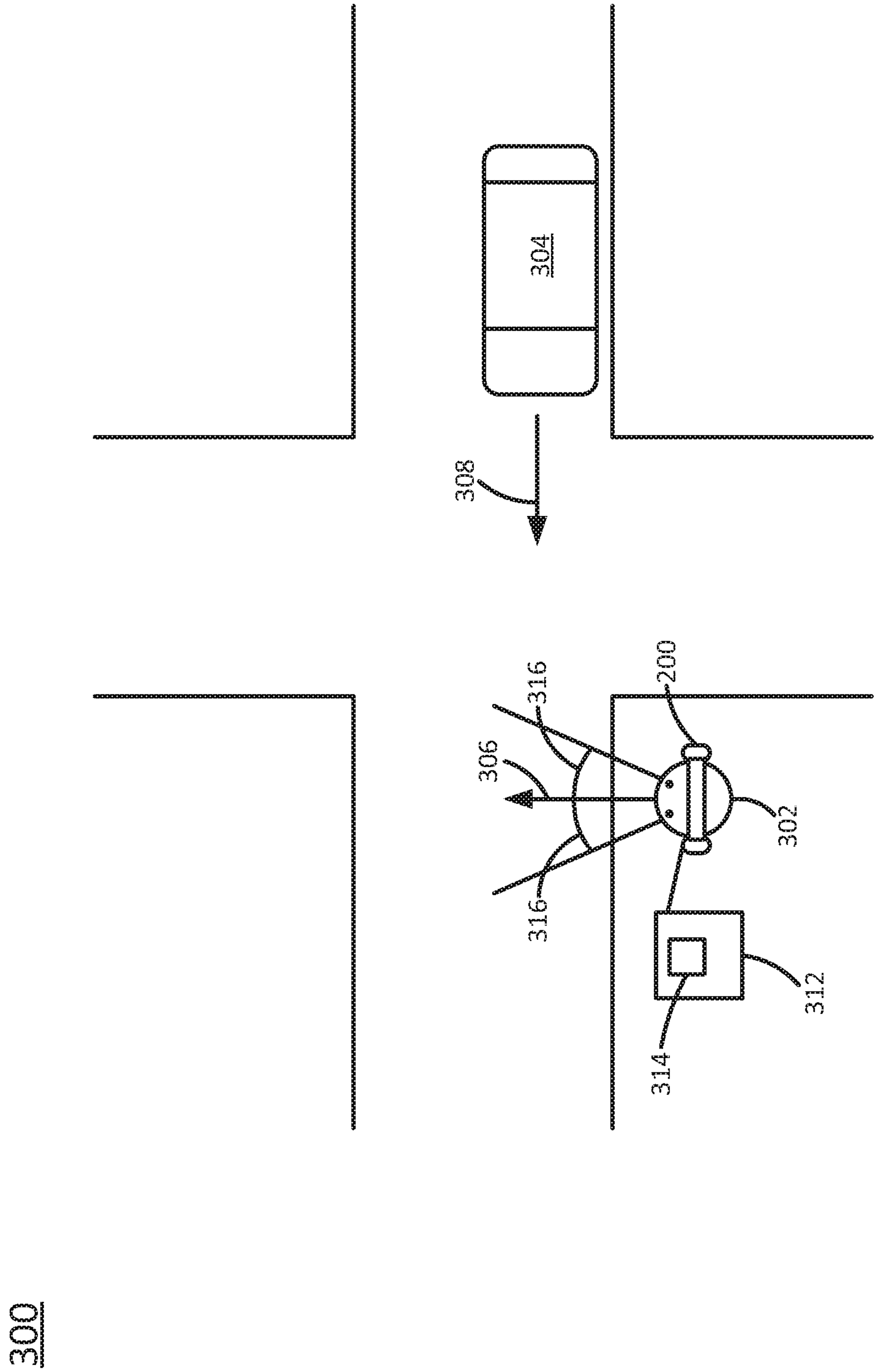
FIG. 3 is a block diagram of an example environment where the noise cancelling headphones may perform event detection of the present disclosure.

FIG. 3 illustrates an example block diagram of an environment 300 where the noise cancelling headphones 200 may perform event detection, as described herein. It should be noted that the noise cancelling headphones 100 may be also be used as an example.

In an example, the environment 300 may be outdoors. A user 302 may be outside walking while listening to music generated by an electronic device 312 that is connected to the noise cancelling headphones 200. In an example, the electronic device 312 may be wirelessly connected to the noise cancelling headphones 200 via a Bluetooth connection. In an example, the noise cancelling headphones 200 may cancel background sounds generated by the environment 300. As a result, the music heard by the user 302 may sound clear and free from the background sounds in the environment 300.

The user 302 may be walking in a direction 306. The user 302 may have a field of view of an angle 316 in either side of the direction 306. For example, if the user 302 is looking straight ahead along the line 306, the user may have a field of view on either side of the line 306 of an angle 316. The angle 316 may be used as a difference threshold. In some examples, the difference threshold may be set by the user 302. For example, some people may have wider fields of view than others. Thus, the difference threshold may be a user defined threshold based on the field of view of the user 302.

As the user 302 is walking in the direction 306, a car 304 may be approaching from a direction 308. The noise cancelling headphones 200 may detect the event of an approaching car. For example, as described above, the sound pattern of the engine noise made by the car may match a sound pattern of known events 206 stored in the memory 204. The noise cancelling headphones 200 may determine that the incoming direction of the background sounds that match a known event is coming from the direction 308 using TDOA calculations, as described above.

In parallel, the noise cancelling headphones 200 may calculate a gaze direction of the user 302. For example, the noise cancelling headphones 200 may use the sensor 218 to determine that the gaze direction is in the direction 306. The angle between the direction 308 and 306 may be approximately 90 degrees. The difference threshold may be approximately 20 degrees (e.g., based on the angle 316 of the field of view of the user 302). Thus, the difference may be greater than the difference threshold.

In response, the noise cancelling headphones 200 may execute a corrective action on the output signal 216 of the noise cancelling headphones 200. In an example, the noise cancelling component 210 may be deactivated so that the background sounds of the approaching car 304 may be heard by the user 302. In another example, the background sounds of the approaching car 304 may be added into the output signal 216 while the noise cancelling component 210 is still activated. In another example, an audible message may be added to the output signal 216. For example, the audible message may state "warning, a car is approaching from your right side."

In an example, the corrective action may also include a notification on the electronic device 312. For example, a message may be shown on a display 314 of the electronic device 312. In an example, the notification may cause the electronic device 312 to vibrate.

As a result, the noise cancelling headphones 200 (or 100) may detect an event and take corrective action if the user is not looking in the same incoming direction of the event that is detected. The noise cancelling headphones 100 and 200 may provide additional safety or context for the user 302 as the user 302 is traveling within the environment 300.

Figure 4:
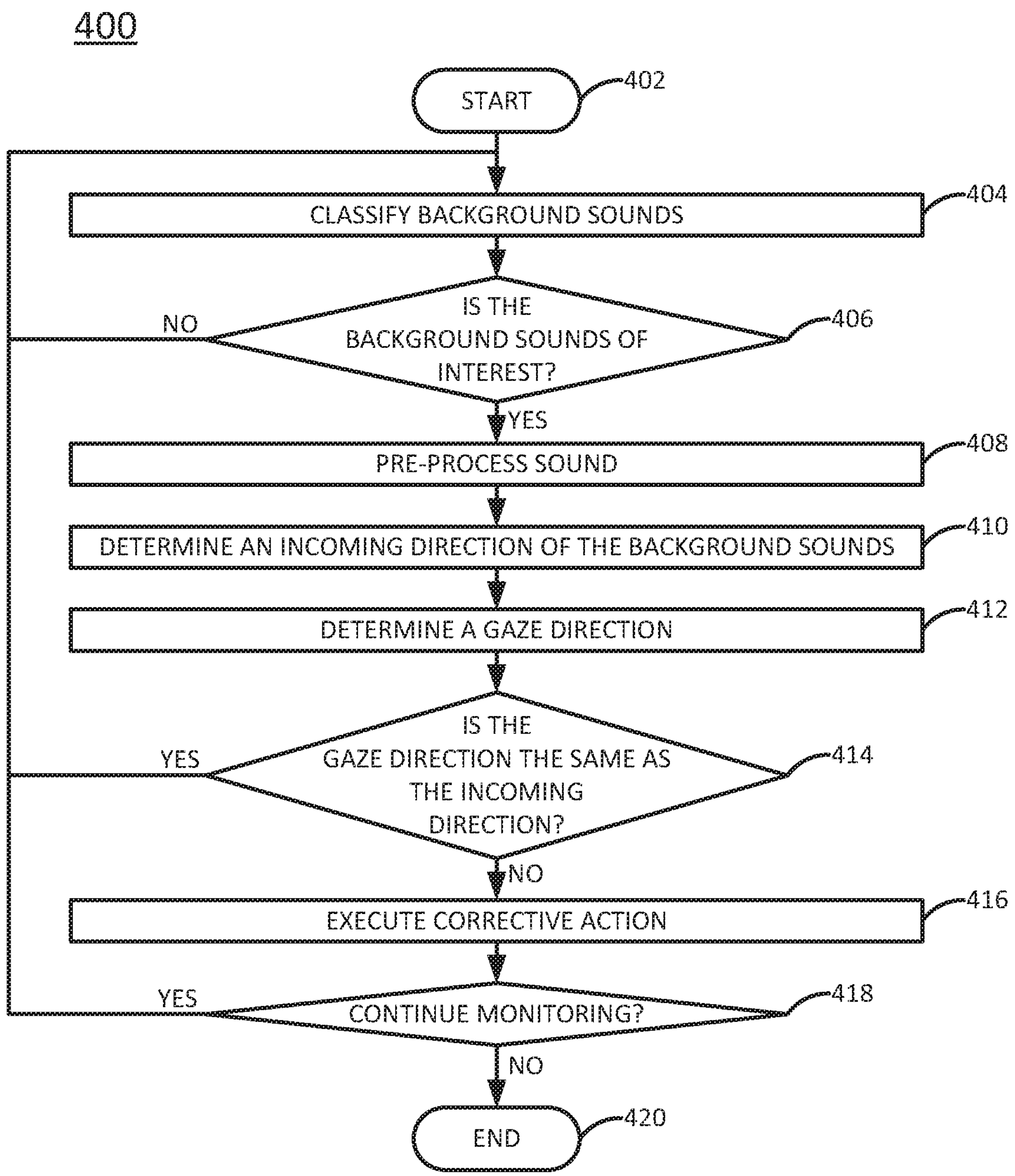
FIG. 4 is an example flow diagram of a method for executing a corrective action in response to an event detected by noise cancelling headphones.

FIG. 4 illustrates a flow diagram of an example method 400 for executing a corrective action in response to an event detected by noise cancelling headphones of the present disclosure. In an example, the method 400 may be performed by the noise cancelling headphones 100, the noise cancelling headphones 200, the apparatus 500 illustrated in FIG. 5 and described below, or the apparatus 600 illustrated in FIG. 6, and described below.

At block 402, the method 400 begins. At block 404, the method 400 classifies background sounds. For example, sound patterns associated with detectable events may be stored in memory. A pre-defined window (e.g., every 10 seconds, every 30 seconds, and the like) of background sounds may be collected and analyzed by comparing the background sounds to the sound patterns stored in memory. A confidence probability may be calculated for each comparison to a sound pattern stored in memory.

In an example, the background sounds may be filtered, or audio classified with a machine learning system within the noise cancelling headphones, to identify individual or unique background sounds. For example, the background sounds may be a combination of different individual sounds (e.g., auto engines, birds, wind, machinery, voices, sirens, rustling leaves, and the like). These individual background sounds may then be compared to the sound patterns stored in memory one background sound at a time.

In an example, the detectable events may be sounds associated with possible dangerous events for a user. For example, the sound pattern may be associated with a moving vehicle (e.g., a car, a semi-truck, a train, a motorcycle, and the like), construction (e.g., moving cranes, jack hammers, clanging metal overhead, and the like), emergency vehicles (e.g., police sirens, ambulance sirens, and the like), and so forth.

At block 406, the method 400 determines if the background sound is of interest. For example, the confidence probability may be compared to a confidence threshold (e.g., 90%, 95%, 99%, and the like). If the confidence probability for any of the sound patterns compared to the background sound is greater than the confidence threshold, then the background sound may be identified as a sound of interest. If the answer to block 406 is no, the method 400 may return to block 404 to continue monitoring and classifying the background sounds that are received. If the answer to block 406 is yes, the method 400 may proceed to block 408.

At block 408, the method 400 may pre-process sounds. For example, the background sounds may be filtered to remove artifacts or other sounds that may not be associated with the sound pattern that is identified. For example, the background sounds may be filtered to remove voices, animal sounds, or any other sounds that may not be associated with the sound pattern of interest.

At block 410, the method 400 determines an incoming direction of the background sounds. In an example, the background sounds may be localized to determine which direction the sounds are coming from along a horizontal plane. A method, such as time-difference of arrival (TDOA) calculation, may be performed to determine the incoming direction of the background sound that is determined to be of interest. For example, at least two microphones may be arranged to receive the background sound. Based on the time-difference of arrival at each microphone, the direction may be determined. In an example, three microphones may be used to improve the accuracy of the TDOA calculations to determine an incoming direction of the sound.

At block 412, the method 400 determines a gaze direction. In an example, the block 412 may be performed in parallel with the block 410. In other words, blocks 410 and 412 may be performed at the same time. In an example, a sensor in the noise cancelling headphones may calculate the gaze direction. For example, the sensor may be a gyroscope or an inertial-measurement unit.

At block 414, the method 400 determines if the gaze direction is the same as the incoming direction of the background sounds. For example, along a horizontal plane, the gaze direction may be compared to the incoming direction. A difference in the gaze direction may be compared to the incoming direction. In an example, the difference may be measured as an angle along the horizontal plane. For example, if the gaze direction and the incoming direction are the same, the difference may be 0 degrees. In an example, if the gaze direction is in the opposite direction as the incoming direction, the direction may be 180 degrees.

The difference may be compared to a difference threshold (e.g., 15 degrees, 45 degrees, 90 degrees, and the like). If the difference is greater than the difference threshold, then it may be determined that the user's gaze is in a direction that is looking sufficiently away from the incoming direction of the background sound. For example, the user may not see an oncoming car or train.

If the answer to block 414 is yes, then the method 400 may return to block 404 to continue monitoring incoming background sounds. For example, the user may be looking in the direction of the incoming background sounds (e.g., the user sees the oncoming car). If the answer to block 414 is no, then the method 400 may proceed to block 416.

At block 416, the method 400 executes a corrective action. For example, the corrective action may modify an outgoing signal of the noise cancelling headphones that is heard by the user. In an example, the corrective action may be to disable a noise cancelling component to remove the inverted signal in the outgoing signal. As a result, the user may hear the background noises.

In an example, the corrective action may be to add the background sound back into the outgoing signal. Thus, even though noise-cancelling is activated, the background sound may be passed through to the user.

In an example, the corrective action may be to add a notification to the outgoing signal. For example, an audible message may be added to the outgoing signal that can be heard by the user. The audible message may be associated with the detected event. For example, if the detected event is an oncoming car, the audible message may state "warning, oncoming car". In an example, the audible message may include a direction that was calculated in block 410. For example, the audible message may state "warning, oncoming car from your left."

In an example, if the noise cancelling headphones are paired with a portable device or smartphone, the notification may be transmitted to the portable device. For example, a pop-up notification may be shown on the portable device if the audio output signal is sound from a movie the user is watching on the portable device, or the notification may cause the portable device to vibrate in case the device is in the user's pocket, and so forth.

At block 418, the method 400 determines if background sounds monitoring should continue. If the answer is yes, the method 400 may return to block 404 to continue monitoring incoming background sounds.

If the answer to block 418 is no, the method 400 may proceed to block 420. For example, the noise cancelling headphones may be turned off or the noise cancellation feature may be turned off. At block 426, the method 400 ends.

Figure 5:
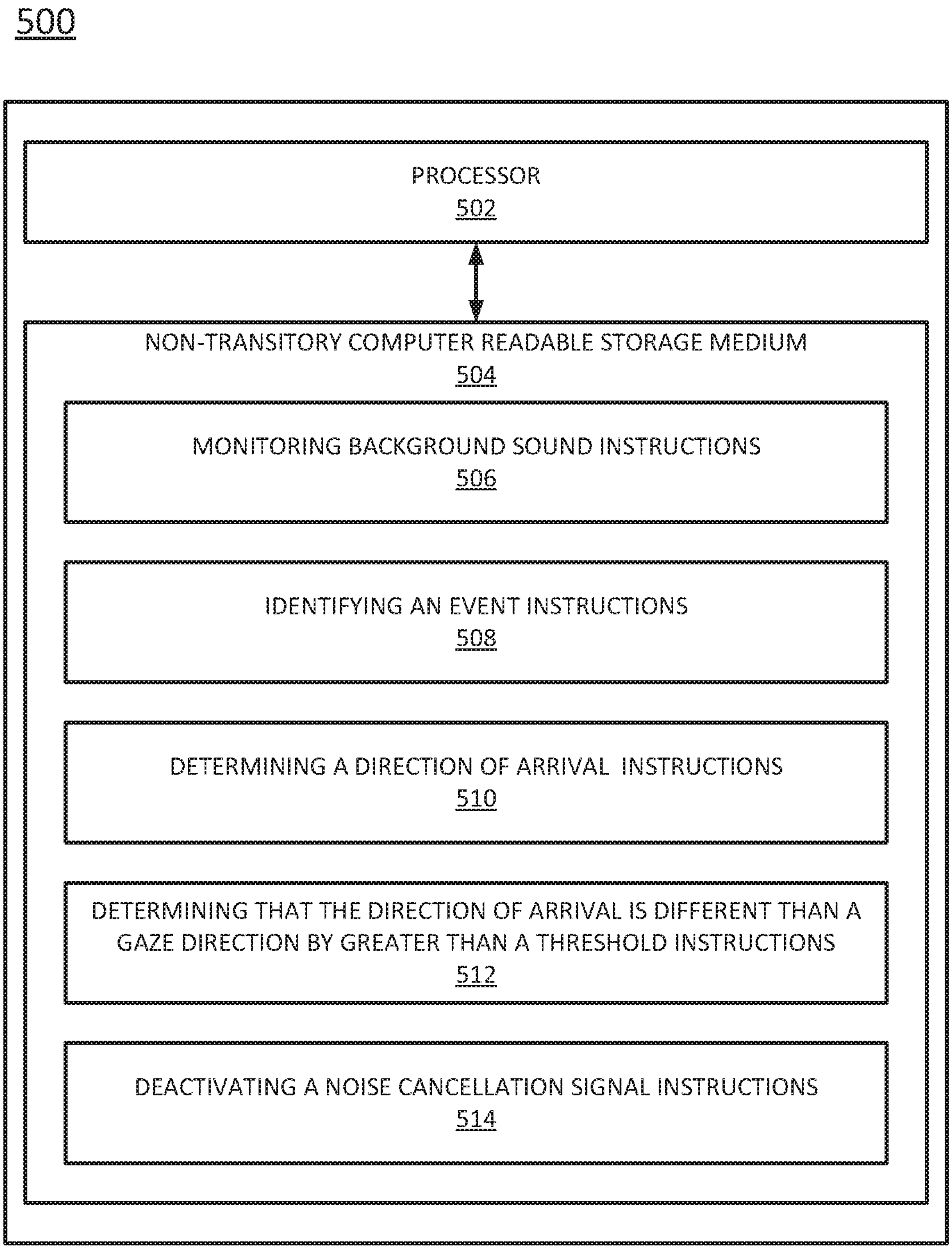
FIG. 5 is an example non-transitory computer readable storage medium storing instructions executed by a processor to execute corrective actions in response to detection of an event by noise cancelling headphones.

FIG. 5 illustrates an example of an apparatus 500. In an example, the apparatus 500 may be the noise cancelling headphones 100 or 200. In an example, the apparatus 500 may include a processor 502 and a non-transitory computer readable storage medium 504. The non-transitory computer readable storage medium 504 may be encoded with instructions 506, 508, 510, 512, and 514 that, when executed by the processor 502, cause the processor 502 to perform various functions.

In an example, the instructions 506 may include monitoring instructions 506. For example, the instructions 506 may monitor a background sound. The background sound may be recorded by microphones within a pre-defined time window of analysis.

The instructions 508 may include identifying instructions. For example, the instructions 508 may identify an event associated with the background sound. The event may be identified by comparing the background sound to sound patterns that are previously associated with an event and stored in memory. The event may be identified when a confidence probability of the background sound compared to one of the sound patterns is greater than a confidence threshold.

The instructions 510 may include determining instructions. For example, the instructions 510 may determine a direction of arrival of the background sound. In an example, the direction of arrival may be calculated using a time-difference of arrival calculation.

The instructions 512 may include determining instructions. For example, the instructions 512 may determine that the direction of arrival is different than a gaze direction by greater than a threshold. In an example, the difference may be measured as an angular difference, and the threshold may be an angle (e.g., 15 degrees, 45 degrees, 90 degrees, and the like). The directions may be along a horizontal plane or may be measured within a three-dimensional space (e.g., along an x-y-z coordinate system).

The instructions 514 may include deactivating instructions. For example, the instructions 514 may deactivate a noise cancellation signal to allow the background sound to pass-through in response to identification of the event and determination that the direction of arrival is different than the gaze direction by greater than the threshold. For example, the user may not be looking in the same direction as the direction the background sound is coming from. As a result, the noise cancellation signal (e.g., the inverted signal to cancel the background noise) may be removed to allow the user to hear the oncoming background sound and avoid the event (e.g., an oncoming car).

Figure 6:
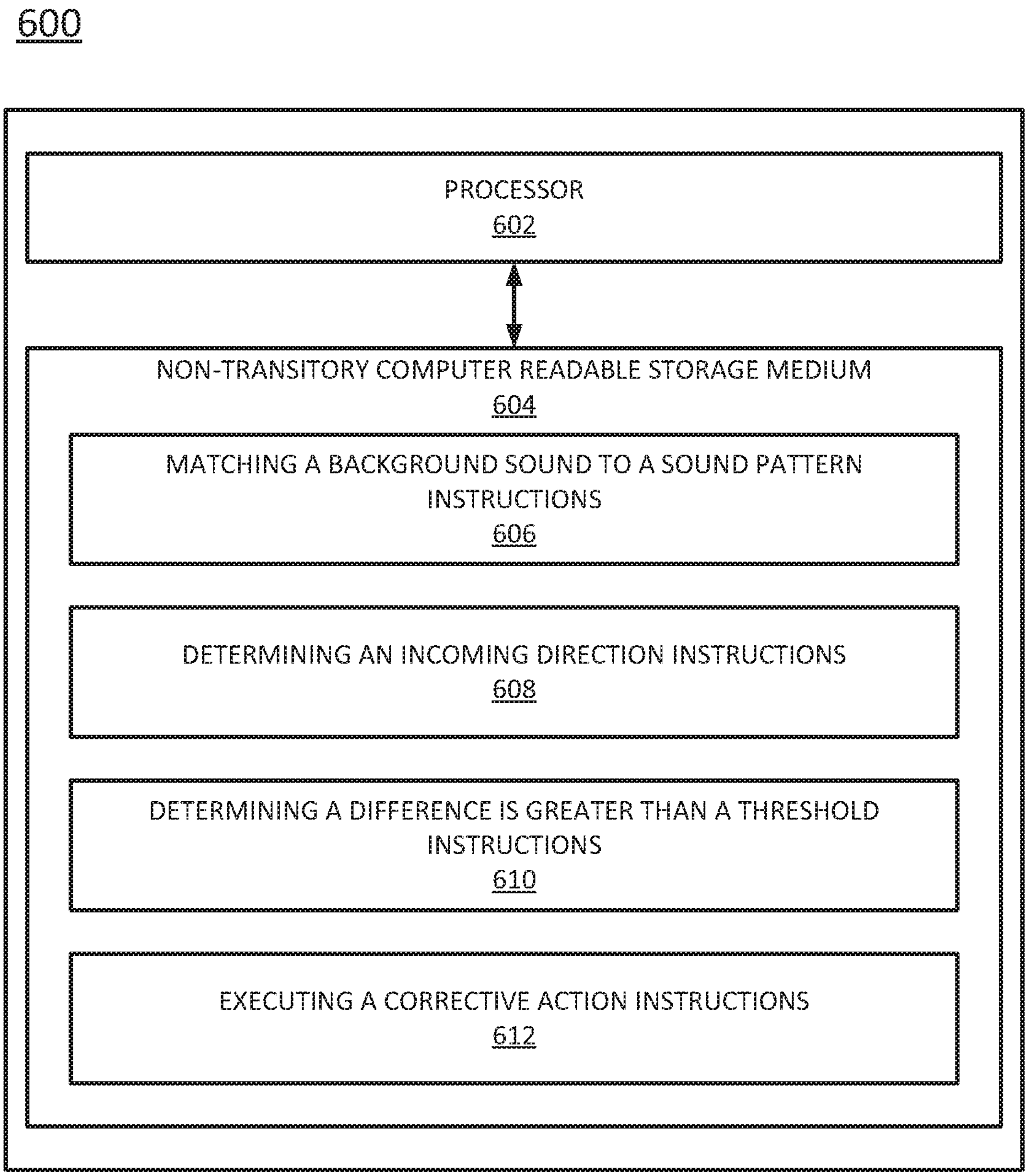
FIG. 6 is an example non-transitory computer readable storage medium storing instructions executed by a processor to deactivate noise cancellation in response to detection of an event by noise cancelling headphones.

FIG. 6 illustrates an example of an apparatus 600. In an example, the apparatus 600 may be the noise cancelling headphones 100 or 200. In an example, the apparatus 600 may include a processor 602 and a non-transitory computer readable storage medium 604. The non-transitory computer readable storage medium 604 may encoded with instructions 606, 608, 610, and 612 that, when executed by the processor 602, cause the processor 602 to perform various functions.

In an example, the instructions 606 may include matching instructions 606. For example, the instructions 606 may match a background sound to a sound pattern to detect an event associated with the sound pattern. For example, the background sound may be compared with sound patterns that are previously associated with an event and stored in memory. A match may be found, and the event may be detected, when a confidence probability of the background sound compared to one of the sound patterns is greater than a confidence threshold.

The instructions 608 may include determining instructions. For example, the instructions 608 may determine an incoming direction of the background sound via a time difference of arrival calculation. In an example, the direction of arrival may be calculated using a time-difference of arrival calculation.

The instructions 610 may include determining instructions. For example, the instructions 610 may determine that a difference in the incoming direction of the background sound is greater than a threshold of a gaze direction. In an example, the difference may be measured as an angular difference and the threshold may be an angle (e.g., 15 degrees, 45 degrees, 90 degrees, and the like). The directions may be along a horizontal plane or may be measured within a three-dimensional space (e.g., along an x-y-z coordinate system).

The instructions 612 may include executing instructions. For example, the instructions 612 may execute a corrective action to an output signal of a noise cancellation component of the apparatus in response to the event being detected and the difference in the incoming direction of the background and the gaze direction being greater than the threshold. For example, the corrective action may include removing an inverted signal from the output signal, adding the background sound to the output signal to allow the background sound to pass-through even while the noise cancellation is activated, adding an audible message or notification to the output signal, and the like.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus comprising:
- a plurality of microphones to record background sounds;
- a noise cancellation component to generate an inverted signal to negate the background sounds from an output signal;
- a memory to store sound patterns associated with known events;
- a speaker to output the output signal;
- a sensor to detect a gaze direction of a user; and
- a processor in communication with the plurality of microphones, the noise cancellation component, and the memory, wherein the processor is to:
  - compare a background sound of the background sounds to the sound patterns stored in the memory;
  - detect an event when a portion of the background sound matches one of the sound patterns stored in memory and is coming from behind the user;
  - execute a corrective action to the output signal in response to the event being detected and the portion of background sound coming from behind the user; and
  - determine that a difference between the gaze direction and an incoming direction of the portion of the background sound that matches the one of the sound patterns stored in memory is greater than a predefined threshold.

2. The apparatus of claim 1, wherein the plurality of microphones comprises at least three microphones.

3. The apparatus of claim 2, wherein the processor is to determine an incoming direction of the portion of the background sound that matches the one of the sound patterns stored in memory using a time difference of arrival calculation with recordings from the three microphones.

4. The apparatus of claim 1, wherein the portion of the background sound matches the one of the sound patterns stored in memory when a confidence probability is greater than a confidence threshold.

5. The apparatus of claim 1, wherein the corrective action comprises removing the inverted signal from the output signal, passing the portion of the background sound that matches the one of the sound patterns stored in memory with the output signal, or adding a notification to the output signal.

6. A non-transitory computer readable storage medium encoded with instructions which, when executed, cause a processor of an apparatus to perform operations, the instructions comprising:
- instructions to monitor a background sound;
- instructions to identify an event associated with the background sound;
- instructions to determine a direction of arrival of the background sound;

instructions to determine that the direction of arrival is different than a gaze direction by greater than a threshold; and instructions to deactivate a noise cancellation signal to allow the background sound to pass-through in response to an identification of the event and a determination that the direction of arrival is different than the gaze direction by greater than the threshold.

7. The non-transitory computer readable storage medium of claim 6, wherein the instructions to monitor comprise instructions to analyze the background sound in a window of a predefined amount of time.

8. The non-transitory computer readable storage medium of claim 6, wherein the instructions to identify comprise:

instructions to compare the background sound against a plurality of sound patterns associated with known events; and instructions to identify the event when a confidence probability of the background sound compared to a sound pattern of the plurality of sound patterns is greater than a confidence threshold.

9. The non-transitory computer readable storage medium of claim 6, wherein the event comprises a sound pattern associated with a moving vehicle.

10. A non-transitory computer readable storage medium encoded with instructions which, when executed, cause a processor of an apparatus to perform operations, the instructions comprising:

instructions to match a background sound to a sound pattern to detect an event associated with the sound pattern;

instructions to determine an incoming direction of the background sound via a time difference of arrival calculation;

instructions to determine that a difference in the incoming direction of the background sound is greater than a threshold of a gaze direction; and instructions to execute a corrective action to an output signal of a noise cancellation component of the apparatus in response to the event being detected and the difference in the incoming direction of the background and the gaze direction being greater than the threshold.

11. The non-transitory computer readable storage medium of claim 10, wherein the corrective action comprise deactivating the noise cancellation component.

12. The non-transitory computer readable storage medium of claim 10, wherein the corrective action comprises adding the background sound back to the output signal.

13. The non-transitory computer readable storage medium of claim 10, wherein the corrective action comprises adding a notification message to the output signal.

* * * * *